(12) United States Patent
Wang

(10) Patent No.: US 6,753,843 B2
(45) Date of Patent: Jun. 22, 2004

(54) FRAME FOR USE IN BACKLIGHT MODULE

(75) Inventor: Ming-Tien Wang, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 327 days.

(21) Appl. No.: 10/098,643

(22) Filed: Mar. 15, 2002

(65) Prior Publication Data

US 2003/0103031 A1 Jun. 5, 2003

(30) Foreign Application Priority Data

Nov. 30, 2001 (TW) ...................................... 90220831 U

(51) Int. Cl.[7] ................................................ G09G 3/36
(52) U.S. Cl. ...................................................... 345/102
(58) Field of Search .......................... 345/87, 90, 101, 345/102, 103, 104, 105, 107, 108

(56) References Cited

U.S. PATENT DOCUMENTS 6,178,224 B1 * 1/2001 Polichar et al. ............ 378/98.2
6,389,105 B1 * 5/2002 Polichar et al. ............ 378/98.3

* cited by examiner

Primary Examiner—Vijay Shankar
(74) Attorney, Agent, or Firm—Senniger, Powers, Leavitt & Roedel

(57) ABSTRACT

The present invention relates to a frame for use in a backlight module, wherein the backlight module comprising a light source, a light guiding plate, at least one sheet, wherein the sheet comprising a top and an edge, and the frame comprising an upper fixing part and a lower fixing part. The upper fixing part comprises a frame main body and a sheet fixing rib, the sheet fixing rib extending inwards from the frame main body and being formed with an inner contacting surface in a bottom thereof for pressing an edge of the top of the at least one sheet, and a light absorbing layer disposed on the inner contacting surface of the sheet fixing rib can be a layer printed with dark-colored ink, a layer coated with dark-colored ink, an anti-reflection treatment layer, or a dark-colored layer integrally formed with the sheet fixing rib. The present invention has advantages that the backlight module prevents light reflecting and has a large viewing angle.

12 Claims, 4 Drawing Sheets

FRAME FOR USE IN BACKLIGHT MODULE

BACKGROUND OF THE INVENTION

1. Field of the Invention

The present invention relates to backlight modules, more particularly, to frames for use in backlight modules of liquid crystal display device.

2. Description of the Related Art

Nowadays, as light weight and thin body of personal computers, notebook computers and communications equipment are required, and the need of liquid crystal display unit rises as well. A typical liquid crystal display unit mainly comprises a chassis, a liquid crystal display panel and a backlight module. In view of the liquid crystal display panel emitting no light, the backlight module is necessary for the liquid crystal display panel to provide enough light; therefore, designs of backlight module become more and more important.

Referring to FIG. 1, it shows a cross-sectional view illustrating a liquid crystal display device of U.S. Pat. No. 5,966,191, wherein a backlight module comprising a sheet set 2, a light guiding plate 3 and a light source 4 disposed on at least one of terminals of the light guiding plate 3. The sheet set 2 which has a top and an edge comprises a protecting sheet 21, a prism sheet 22, a diffusing sheet 23, and/or a reflecting sheet 24. The whole backlight module is fixed by a frame, wherein the frame comprising an upper fixing part 1 and a lower fixing part 5 which are separate or un-separate. The lower fixing part 5 can be provided by a back cover of the liquid crystal display device, and the upper fixing part 1 comprises a frame main body 11 and a sheet fixing rib 12. The sheet fixing rib 12 extends inwards from the frame main body 11 for pressing an edge of the top of a most upper sheet i.e. the protecting sheet 21 to fix the whole backlight module and protect the liquid crystal display device from damages of hitting or shaking directly.

Light properties of the frame comprising view angle of the whole monitor, light reflection and light efficiency influence effects of the backlight module a lot. Following are two ways of treating the light properties of the frame in this field:

(1) Using the black upper fixing part

The black upper fixing part 1 and white lower fixing part 5 are used.

Because the upper fixing part is black, emission light from the backlight module is sheltered. Furthermore, productions of the upper fixing part are easy. On the other hand, as a result of the whole upper fixing part 1 being black, light is absorbed thereby, which will reduce the light efficiency a lot. Besides, when users watch from lateral sides, shadow appears on the black upper fixing part, making the view angle smaller; thus, users have a illusion that the monitor is smaller.

(2) Using the white upper fixing part

Although replacing by the white upper fixing part can avoid the disadvantages of utilizing the black one, shinning lines appear instead as a result of reflecting light by white color. Thus, the sheets should be treated. Referring to FIG. 2, it shows printed regions of the sheet. Taking the sheet 21 as an example, a region of a top of the sheet 21 covered by the sheet fixing rib 211 should be printed with black ink when applying the white upper fixing part. The advantages of such backlight module are higher light efficiency, larger view angle and the liquid crystal display device seeming larger when users watching. On the other hand, the disadvantages are that printing ink onto the sheet is more difficult and costs of manufacturing is relative high.

Thus, it is necessary to provide a novel and improved frame to overcome the problems mentioned above.

SUMMARY OF THE INVENTION

One objective of the present invention is to provide a frame for use in a backlight module, wherein the backlight module comprising a light source, a light guiding plate, at least one sheet, wherein the sheet comprising a top and an edge, and the frame comprising an upper fixing part and a lower fixing part. The upper fixing part comprises a frame main body and a sheet fixing rib, wherein the sheet fixing rib with a light absorbing layer on the inner contacting surface extends inwards from the frame main body to press an edge of the top of the at least one sheet, and the light absorbing layer disposed on the inner contacting surface of the sheet fixing rib can be a layer printed with dark-colored ink, a layer coated with dark-colored ink, an anti-reflection treatment layer, or a dark-colored layer integrally formed with the sheet fixing rib. The present invention has advantages that the backlight module prevents light reflecting and has a large viewing angle.

DETAILED DESCRIPTION OF THE INVENTION

Figure 1:
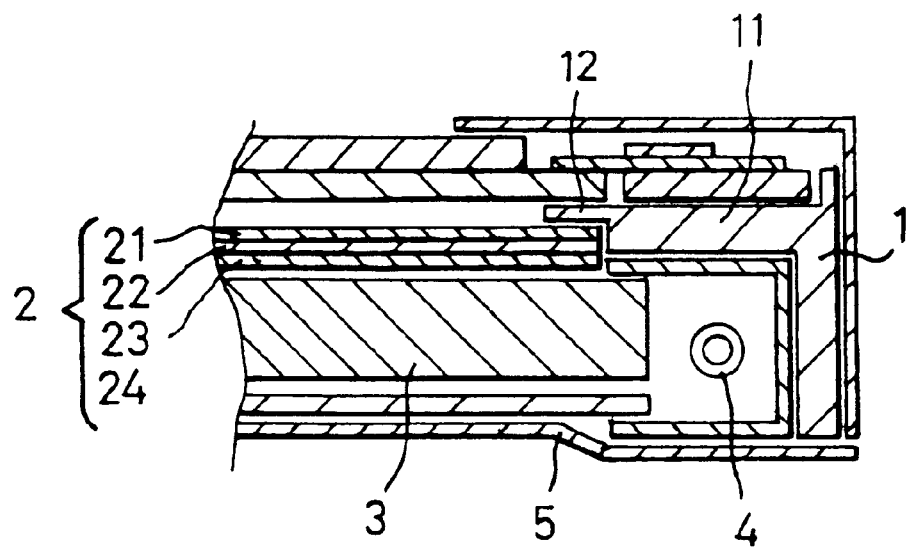
FIG. 1 is a cross-sectional view illustrating the conventional liquid crystal display device.
Figure 2:
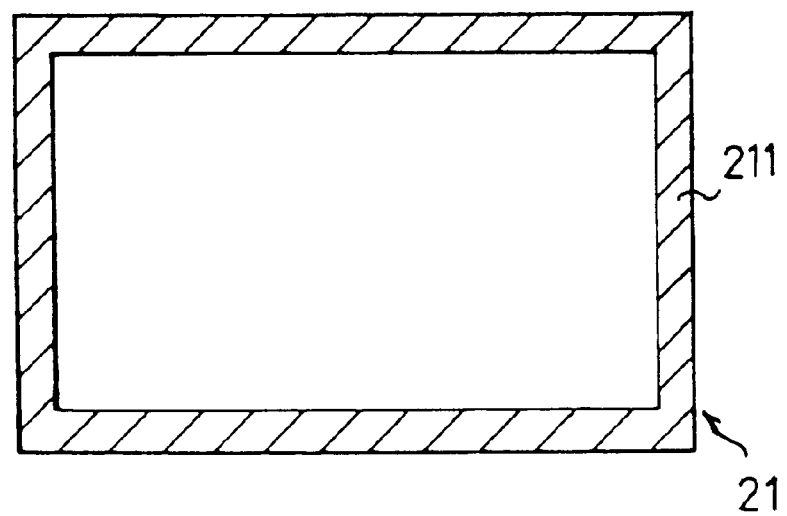
FIG. 2 illustrates the conventional printed region of sheet.
Figure 3:
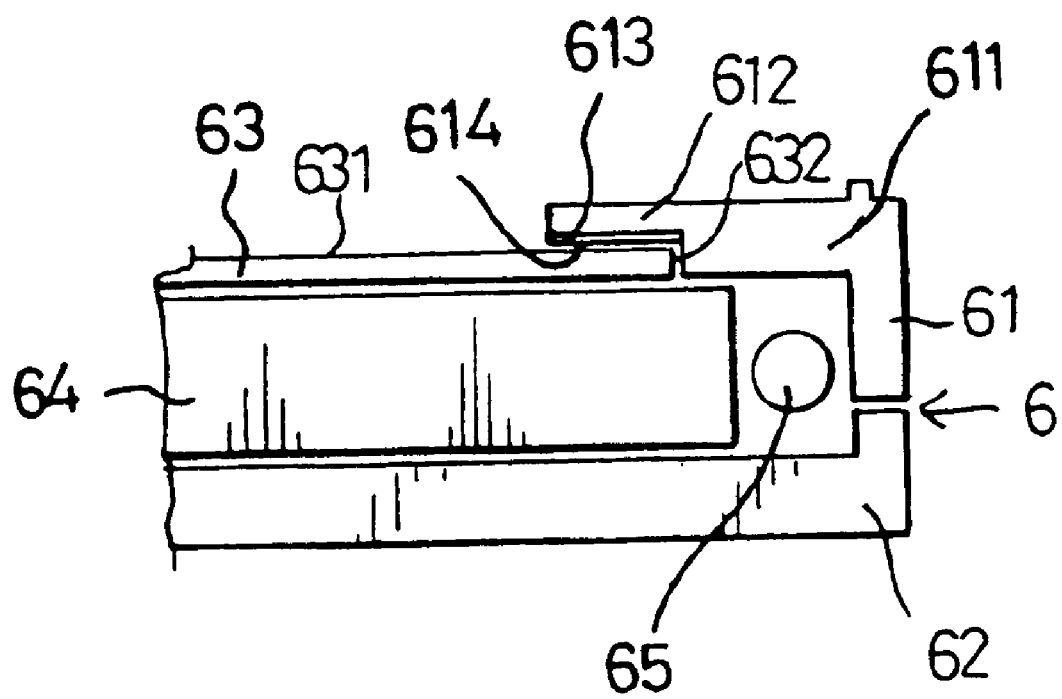
FIG. 3 is a cross-sectional view illustrating the backlight module according to an embodiment of the invention.
Figure 4:
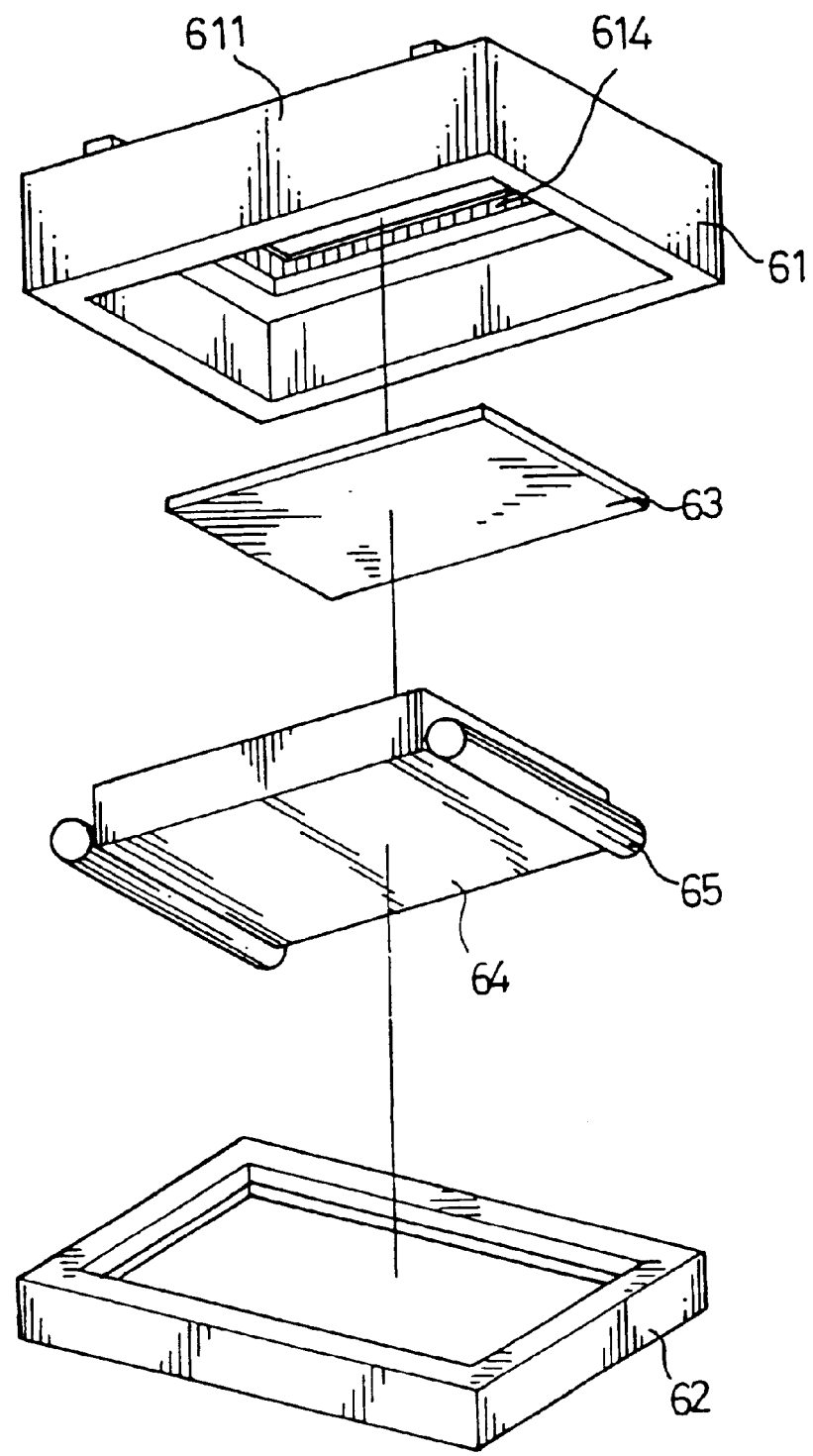
FIG. 4 is an exploded view illustrating the backlight module according to an embodiment of the invention.

Referring to a backlight module 6 in FIGS. 3 and 4, the backlight module 6 comprises an upper fixing part 61, a lower fixing part 62, a sheet 63, a light guiding plate 64, and a light source 65. The sheet 63 has a top 631 and an edge 632, and the backlight module 6 can be applied with single layer of sheet or multiple layers which are the combinations of various sheets, taking the single sheet 63 as an example herein. The upper fixing part 61 comprises a frame main body 611 and a sheet fixing rib 612, wherein the sheet fixing rib 612 extending inwards from the frame main body 611 for pressing an edge of the top 631 of the sheet 63 and being formed with an inner contacting surface 613 in a bottom thereof. The inner contacting surface 613 of the sheet fixing rib 612 coated with dark-colored ink to form a light absorbing layer 614 is in contact with the top 631 of the sheet 63. The light guiding plate 64 comprising a plurality of terminals and a bottom is disposed under the sheet 63. Furthermore, the light guiding plate 64 is clamped between the upper fixing part 61 and the lower fixing part 62 with the support of the lower fixing part 62. The light source 65 disposed at the terminal of the light guiding plate 64 is fixed integrally between the light guiding plate 64 and the upper and lower fixing parts 61 and 62. After combining the upper fixing part 61 and the lower fixing part 62, the sheet 63, light guiding plate 64 and the light source 65 are fixed, and the whole backlight module 6 is further fixed to an outer housing of a liquid crystal display device.

Figure 5:
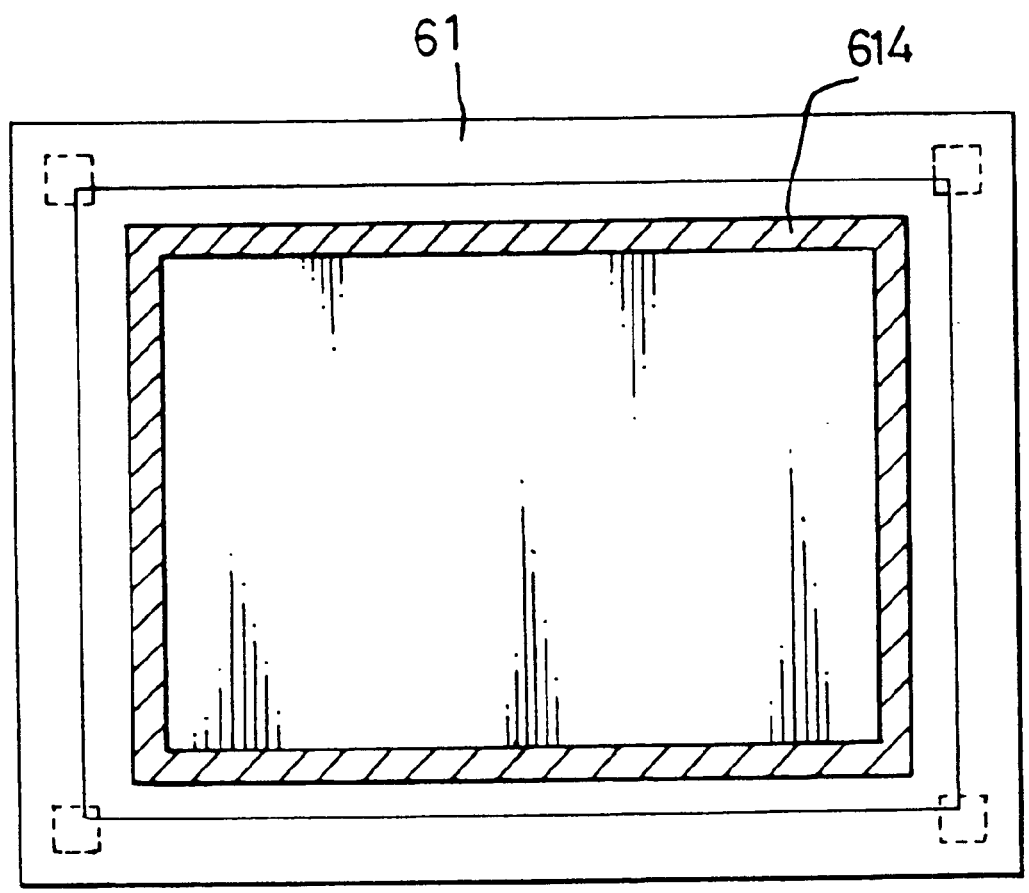
FIG. 5 is a bottom view illustrating the backlight module according to an embodiment of the invention.

A bottom view of the upper fixing part 61 mentioned above is shown in FIG. 5. The light absorbing layer 614 on the inner contacting surface 613 of the sheet fixing rib 612 is printed with black ink corresponding to a region in contact with the edge of the top 631 of the sheet 63.

In order to make better the light efficiency of the backlight module 6 as well as to shelter light to have a large viewing angle, and avoid costs of printing the sheet, the present invention improves the upper fixing part 61 which is characterized in having the light absorbing layer 614 on the inner contacting surface 613 of the sheet fixing rib 612. The light absorbing layer 614 suitable for the present invention is not limited to a layer which is printed with light-absorbed ink (e.g. dark-colored or black ink), and a coated layer which is coated with light-absorbed ink (e.g. dark or black ink) and an anti-reflection treatment layer can be selected for the same use. When integrally forming the frame, double colors forming which the inner contacting surface 613 of the sheet fixing rib 612 is formed in dark color and other parts are formed in light color, can be also applied in treating the light absorbing layer 614.

The light absorbing layer 614 on the inner contacting surface 613 of the sheet fixing rib 612 can shelter and not reflect the emitted backlight properly; therefore, shine lines will not appear. Thus, the present invention does not make users' eyes feel tired when watching the liquid crystal display device. The upper fixing part 61 of the present invention is in light color (e.g. white) except for the dark-colored light absorbing layer 614 on the inner contacting surface 613, and users will not be aware of the light absorbing layer 614. Thus, viewing angle and the frame seem larger and light efficiency will not be reduced because of the light absorbing layer 614.

The light source is disposed on the at least one terminals of the light guiding plate in one embodiment of the present invention. In addition, another embodiment of the present invention is applied in a direct under type backlight module; i.e. the light source is placed under the light guiding plate.

The present invention also avoids the sheet from printing thereon in the prior art, while a printing process costs a lot and needs more difficult and complex techniques. Therefore, the present invention substantially slash the cost without losing original effects, that is of better application in this field in view of cost control and process easiness.

The present invention is suitable for all kinds of backlight module of liquid crystal display device wherein the backlight module comprising combinations of sheets, light guiding plate, light source, frame, and other elements which are added to have additional effects. The frame is not limited to specific shapes and not in single or separable combination units. Such subjects, which can fix the sheets, light guiding plate and light source and have light absorbing layer on the inner contacting surface, are in the scope of the present invention.

While embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A frame for use in a backlight module, wherein the backlight module comprises a light source, a light guiding plate and at least one sheet stacked over the light guiding plate, the at least one sheet having a top; the frame comprising:
    an upper fixing part which comprises a frame main body and a sheet fixing rib, the sheet fixing rib extending inwards from the frame main body and being formed with an inner contacting surface in a bottom thereof for pressing an edge of the top of the at least one sheet, and a light absorbing layer disposed on the inner contacting surface of the sheet fixing rib; and
    a lower fixing part connecting under the light guiding plate with the upper fixing part.

2. A frame according to claim 1, wherein the light absorbing layer disposed on the inner surface of the sheet fixing rib is a layer printed with dark-colored ink.

3. A frame according to claim 1, wherein the light absorbing layer disposed on the inner contacting surface of the sheet fixing rib is a layer coated with dark-colored ink.

4. A frame according to claim 1, wherein the light absorbing layer disposed on the inner contacting surface of the sheet fixing rib is an anti-reflection treatment layer.

5. A frame according to claim 1, wherein the light absorbing layer disposed on the inner contacting surface of the sheet fixing rib is a dark-colored layer integrally formed with the sheet fixing rib.

6. A frame according to claim 2, wherein the dark-colored layer is a black layer.

7. A frame according to claim 3, wherein the dark-colored layer is a black layer.

8. A frame according to claim 5, wherein the dark-colored layer is a black layer.

9. A frame according to claim 1, wherein the upper fixing part is made of light-colored material except an area where the light absorbing layer indisposed on the inner contacting surface of the sheet fixing rib.

10. A frame according to claim 9, wherein the upper fixing part is made of white-colored material.

11. A frame according to claim 1, wherein the light guiding plate comprises a plurality of terminals, and the light source is disposed on the at least one of terminals of the light guiding plate.

12. A frame according to claim 1, wherein the light guiding plate comprises a bottom, and the light source is disposed under the bottom of the light guiding plate.

* * * * *